United States Patent [19]
Birchler et al.

[11] Patent Number: 5,884,215
[45] Date of Patent: Mar. 16, 1999

[54] METHOD AND APPARATUS FOR COVARIANCE MATRIX ESTIMATION IN A WEIGHTED LEAST-SQUARES LOCATION SOLUTION

[75] Inventors: Mark A. Birchler, Roselle; Debra A. Jones; Nicholas C. Oros, both of Schaumburg, all of Ill.

[73] Assignee: Motorola, Inc., Schaumburg, Ill.

[21] Appl. No.: 792,331

[22] Filed: Jan. 31, 1997

[51] Int. Cl.$^6$ ............................... G06G 7/78; G01S 3/02
[52] U.S. Cl. ...................... 701/207; 701/213; 701/216; 342/457; 342/357; 342/446; 73/178 R
[58] Field of Search .................................. 701/200, 216, 701/217, 213, 215, 221, 224, 226; 340/988, 990, 995, 991; 342/357, 457, 352, 450, 446; 235/95 R; 73/178 R

[56] References Cited

U.S. PATENT DOCUMENTS

| | | | |
|---|---|---|---|
| 5,202,829 | 4/1993 | Geier | 701/215 |
| 5,416,712 | 5/1995 | Geier et al. | 701/216 |
| 5,436,632 | 7/1995 | Sheynblat | 342/357 |
| 5,450,448 | 9/1995 | Shynblat | 342/358 |
| 5,525,998 | 6/1996 | Geier | 701/213 |
| 5,563,917 | 10/1996 | Sheynblat | 342/358 |
| 5,583,517 | 12/1996 | Yokev et al. | 342/457 |
| 5,587,716 | 12/1996 | Sheynblat | 342/357 |
| 5,592,180 | 1/1997 | Yokev et al. | 342/457 |

*Primary Examiner*—Jaques H. Louis-Jacques

[57] ABSTRACT

Signals exchanged between a fixed infrastructure (110–116) and a mobile unit (160) give rise to M channel quality metrics. The channel quality metrics are mapped, via predetermined relationships (501–503), in to M corresponding time of arrival variances, which in turn are used to derive M−1 time of arrival differential variances. A time of arrival differential weighting matrix including, in part, the time of arrival differential variances, is used to calculate a WLS solution, which solution is an estimate of a location of the mobile unit. This procedure may be implemented using an infrastructure-based location processor (130) operating in conjunction with the mobile unit, or may be performed by either the location processor or mobile unit alone.

48 Claims, 4 Drawing Sheets

METHOD AND APPARATUS FOR COVARIANCE MATRIX ESTIMATION IN A WEIGHTED LEAST-SQUARES LOCATION SOLUTION

FIELD OF THE INVENTION

The present invention relates generally to location determination in wireless communication systems and, in particular, to the estimation of a covariance matrix for a weighted least-squares solution.

BACKGROUND OF THE INVENTION

Wireless communication systems are known in which mobile units (e.g., in-car mobile or in-hand portable radios) wirelessly communicate with a fixed communication infrastructure comprising a plurality of geographically-diverse transceivers. In such systems, methods for determining location information for a given mobile unit are known. In particular, the well-known weighted least squares (WLS) solution can be used to determine location information as shown, for example, in U.S. Pat. No. 5,416,712 issued to Geier et al.

Succinctly stated, the WLS approach to location determination attempts to iteratively derive a location estimate for a mobile unit based, in part, on distance estimates between the mobile unit and fixed transmitters having known locations. Given that distance can be calculated as the product of velocity and time, the distance estimates (referred to as pseudo-ranges or PRs) are calculated in practice by multiplying the propagation delays between the mobile unit and fixed transmitters with the speed of light. Assuming ideally measured propagation delays, the location of the mobile unit can be calculated using the pseudo-ranges with little or no error. However, propagation delays are measured in practice using transmitted signals, which signals are subject to the effects of various error sources, e.g., noise, multipath interference, distortion, etc. The resultant errors in the delay measurements are translated into errors in the pseudo-ranges and, consequently, into error in the location estimate.

In order to combat the presence of measurement errors, the WLS solution factors the reliability of the various measurements into the location estimation. That is, the WLS solution, when used to estimate location, places greater reliance on measurements having greater reliability, and discounts those measurements having less reliability. In this manner, the WLS approach offers a significant performance advantage over non-weighted techniques. In practice, however, the reliability of a signal cannot be directly measured, but must be described as the variance of a stochastic variable.

Various methods for incorporating measurement reliability into a location determination context are known in the art. For example, in U.S. Pat. No. 5,202,829 issued to Geier, Kalman filters are used to assess the "quality" of pseudo-ranges measured using GPS receivers located in a ship and accompanying tailbuoys. Additionally, in U.S. Pat. No. 5,436,632 issued to Sheynblat, a system is disclosed wherein redundant GPS receivers at known locations (reference stations and integrity monitors) are employed to provide corrections for pseudo-range measurements made by a mobile unit also equipped with a GPS receiver. Sheynblat discusses the use of a WLS solution in which "measurement error covariance" is determined based on receiver noise as represented by errors between a given reference station and its corresponding integrity monitor.

While Geier and Sheynblat incorporate reliability determinations to improve the accuracy of location estimates, such techniques are not readily adaptable to mobile and portable wireless communication environments. First, both Geier and Sheynblat require the use of GPS receivers. Such receivers add significant cost to mobile/portable equipment and prohibitively add to the size and complexity of such equipment, particularly portable radios.

Additionally, as noted in '712 Geier, the use of Kalman filters requires significantly more computing power than a WLS solution. In portable units, computing power is often limited by size and battery life considerations, making the use of the computationally-expensive Kalman filter approach less attractive. Therefore, a need exists for a method which incorporates the advantages of a WLS location solution without the need for costly GPS equipment. In particular, what is needed is a technique for estimating a covariance matrix for use in a WLS solution.

DESCRIPTION OF A PREFERRED EMBODIMENT

The present invention provides a method and apparatus for estimating a covariance matrix for use in weighted least squares location determinations. Generally, signals exchanged between a fixed infrastructure and a mobile unit give rise to M channel quality metrics (M≧3). The channel quality metrics are used to derive M corresponding time of arrival variances, which in turn are used to derive M-1 time of arrival differential variances. Predetermined relationships are used to map the channel quality metrics in to the time of arrival variances. A time of arrival differential weighting matrix—an estimate of a covariance matrix—comprising, in part, the time of arrival differential variances, is used to calculate a WLS solution, which solution is an estimate of a location of the mobile unit. This procedure may be implemented using an infrastructure-based location processor operating in conjunction with a mobile unit, or may be performed by either the location processor or mobile unit alone. In this manner, a WLS solution can be advantageously employed in a location determination context without the need for GPS equipment.

Figure 1:
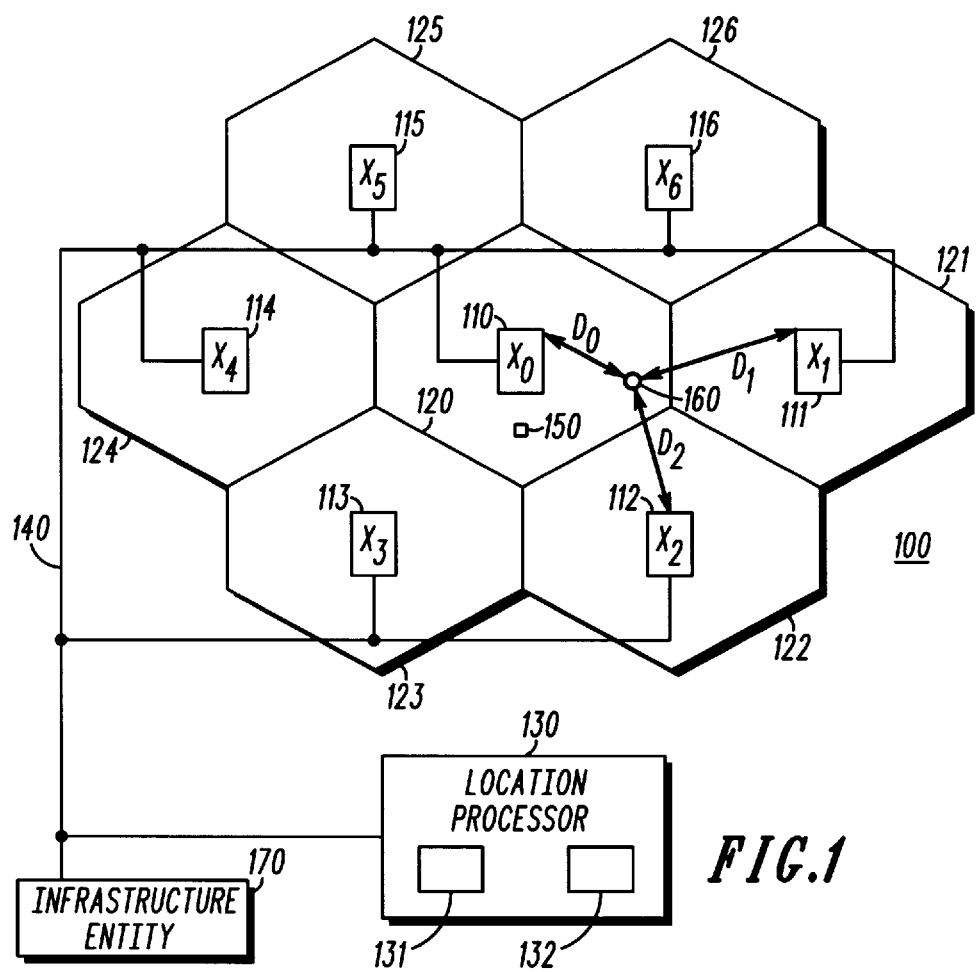
FIG. 1 is a block diagram of a wireless communication system.

The present invention can be more readily described with reference to FIGS. 1–9. FIG. 1 is a block diagram of a wireless communication system 100, such as an IDEN™ system manufactured by Motorola, Inc. The wireless communication system 100 comprises geographically-diverse fixed transceivers 110–116 coupled to a location processor 130 via a network 140, and a plurality of mobile units 160 (only one shown). Although not shown in FIG. 1, each mobile unit 160 includes memory and one or more digital computing devices used to store and execute software programs, as known in the art.

The coverage area provided by each transceiver 110–116 gives rise to a corresponding cell 120–126, represented by hexagons as shown. In practice, each transceiver 110–116 may actually comprise a bank of transceivers, although it is assumed hereinafter that each cell includes only a single transceiver for simplicity. While a mobile unit roams throughout the system 100, wireless communication services for the mobile unit are managed and provided by a serving site. Neighbor sites are those sites surrounding the current serving site. In the example shown in FIG. 1, the site identified by reference numeral 110 functions as the serving site for the mobile unit 160, and the sites identified by reference numerals 111–116 correspond to neighbor sites.

The transceivers 110–116—which in the preferred embodiment provide wireless channels according to a time-division multiplexed (TDM) format—and the location processor 130 collectively are referred to as a fixed infrastructure. Being fixed, the precise location of each transceiver 110–116 is known with high accuracy as determined by surveying or other suitable measurement techniques.

As described below, the present invention relies on channel quality metrics derived from signals received or transmitted by a mobile unit. In the preferred embodiment, each of these signals comprise known data symbols unique to each transceiver. For example, in an IDEN™ system, each transceiver will transmit its known data symbols whenever an unused time slot becomes available.

The network 140 allows data and control information to be conveyed between the various infrastructure elements and operates in accordance with well-known network protocols. The fixed infrastructure may also include various other network entities 170 that may serve as the requesters of, or the destination for, location information for a given mobile unit. Examples of such infrastructure entities include, but are not limited to, consoles, telephone interconnect devices, and management terminals.

The location processor 130 includes a digital computing device 131 and memory 132 used for the storage and execution of software programs. In practice, a commercially available computer workstation or a customized computer platform may be used to implement the location processor 130. In the preferred embodiment, the methods described hereinafter are implemented as software programs resident in the location processor 130 and/or mobile units 160.

Figure 2:
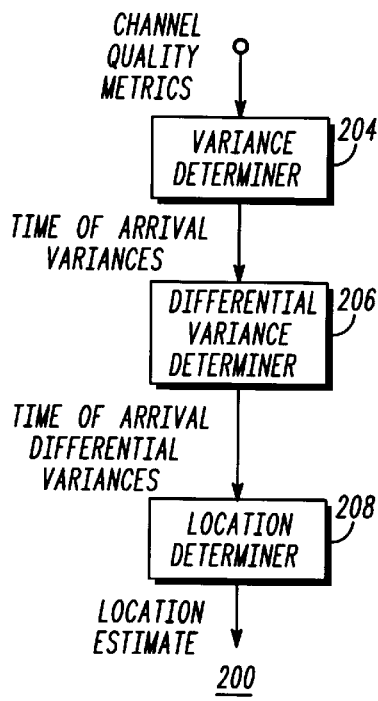
FIG. 2 is a block diagram of a location processor.

FIG. 2 is a block diagram of a location processor 200 comprising a variance determiner 204, a differential variance determiner 206 coupled to the output of the variance determiner 204, and a location determiner 208 coupled to the output of the differential variance determiner 206. In the preferred embodiment, each block shown in FIG. 2 is implemented as one or more software-based algorithms stored in memory and executed by a digital computing device resident in the location processor 200. It is nonetheless understood that other, non-software based implementations may also be used.

The variance determiner 204 takes as input channel quality metrics. As described below, each channel quality metric uniquely corresponds to a signal received by a particular mobile unit or, in another embodiment, to a signal received by one of the fixed transceivers. The output of the variance determiner 204 is time of arrival variances having a one-to-one correspondence with the channel quality metrics. The time of arrival variances are indicative of the uncertainty as to exactly when each signal was received by the mobile unit (or fixed transceiver).

The differential variance determiner 206 combines the time of arrival variances to produce time of arrival differential variances. As described below, the time of arrival differential variances are used to populate a time of arrival differential weighting matrix used in a WLS solution, as calculated by the location determiner 208. The location estimate output by the location determiner 208 represents an iteratively updated nominal location estimate judged to be sufficiently accurate when correction values used to update the nominal estimate have converged below minimum thresholds.

Figure 3:
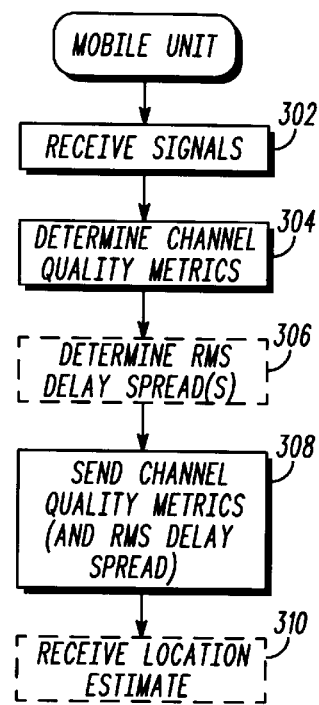
FIG. 3 is a flowchart illustrating operation of a mobile unit when the mobile unit cooperates with a location processor to determine a location for the mobile unit.

In the preferred embodiment, the location processor of FIG. 2 cooperates with a mobile unit when determining a location for that mobile unit. FIG. 3 illustrates operation of a mobile unit when location information for the mobile unit is to be determined in conjunction with a location processor. At step 302, the mobile unit receives M signals from M different geographically-diverse transceivers (M≧3). Each of the signals uniquely corresponds to one of the transceivers, and each signal comprises known data symbols transmitted by its corresponding transceiver.

The delay between when the known data symbols were transmitted and when they were received serve as the basis for determining pseudo-ranges between the mobile unit and each of the transceivers. In practice, the delay calculated for a given transceiver is actually an average performed over the delays measured for multiple receptions of the known data symbols. Referring to the example shown in FIG. 1, the mobile unit 160 is assumed to receive signals from three transceivers, labeled $X_0$, $X_1$ and $X_2$, each transceiver also having associated with it a pseudo-range $D_0$, $D_1$ and $D_2$, respectively.

As known in the art, differential pseudo-ranges (DPRs) can be formed and used as the basis for a WLS location solution. Continuing with the example of FIG. 1, DPRs can be defined as:

$$D_{01} = D_0 - D_1$$

$$D_{02} = D_0 - D_2$$

Although the serving site is used as the reference in the above example, one of the neighbor sites can just as easily be used. In practice, the known data symbols are subject to errors, including time of transmission synchronization errors (TOTS errors). In order to account for such errors, the PR measurement between a given transceiver and the mobile unit is defined as:

$$D_i = D_i + e_i$$

and the DPRs are defined as:

$$D_{01} = D_0 - D_1$$

$$D_{02} = D_0 - D_2$$

Where $e_i$ is the known TOTS error for the i'th transceiver. If PRs are calculated by the mobile, such TOTS errors for each transceiver can be conveyed to the mobile.

Having received M signals from the transceivers, the mobile unit, at step 304, determines M channel quality metrics. Preferably, an average over multiple receptions of known data symbols are used to derive each channel quality metric. In this manner, the effects of noisy signal quality measurements can be mitigated. The channel quality metrics take the form of carrier-to-interference-plus-noise ratios (C/I+N). Techniques for measuring such C/I+N ratios are taught in U.S. Pat. No. 5,440,582 entitled A METHOD AND APPARATUS FOR DETERMINING SIGNAL USABILITY, which patent is hereby incorporated by reference verbatim and with the same effect as though the same patent were fully and completely set forth herein. However, other indicia of signal quality (e.g., received signal strength) may be used in place of, or as supplement to, C/I+N. Regardless of how determined, each channel quality metric has a one-to-one correspondence to the known data symbols received from at least three sites (M≧3). In practice, one of the sites will be the current serving site for the mobile unit, although it is permissible that each of the at least three sites is a neighboring site to the current serving site.

At step 306, the mobile optionally determines M RMS delay spreads, wherein each RMS delay spread uniquely corresponds to one of the M signals. As known in the art, received signals are often subject to distortion due to multipath interference and delays. An RMS delay spread expresses the standard deviation (or root-mean-square) value of the delay of reflections, weighted proportional to the energy in the reflected waves. In this manner, the RMS delay spread serves as an indicator of the effect of the current multipath propagation environment on known data symbols received by the mobile unit. Methods for determining RMS delay spreads are known in the art.

At step 308, the channel quality metrics and the RMS delay spreads, if calculated, are sent by the mobile unit to the location processor. Assuming that multiple receptions of known data symbols are averaged together when calculating each channel quality metric, the number of receptions of known data symbols used, $N_i$, is also transmitted.

At step 310, responsive to the information sent in the previous step, the mobile unit optionally receives a location estimate for the mobile unit from the location processor. It is also possible that having executed steps 302–308, the mobile unit will not receive the location estimate. This would be the case, for example, when the location information is requested by some party other than the mobile unit, e.g., an infrastructure entity associated with the wireless communication system, or even another mobile unit.

Figure 4:
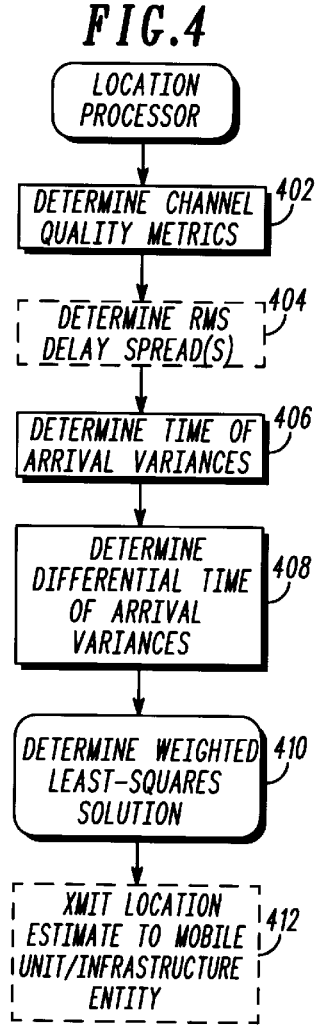
FIG. 4 is a flowchart illustrating operation of a location processor when the location processor cooperates with a mobile unit to determine a location of the mobile unit.

Referring now to FIG. 4, a flowchart is shown illustrating operation of a location processor when location information for a mobile unit is to be determined in conjunction with the location processor. At step 402, in response to a request to determine a location estimate for the given mobile unit, the location processor determines M channel quality metrics for the mobile unit. In the preferred embodiment, the channel quality metrics are "determined" by the location processor when they are received as inbound data from the mobile unit. In such a case, for each channel quality metric, the number of receptions of known data symbols used in the calculation of that channel quality metric is also received. However, as those having ordinary skill in the art will appreciate, it is possible that the location processor can determine suitable channel quality metrics itself based on other data received from the mobile unit.

At step 404, the location processor may optionally receive information regarding at least one RMS delay spread measurement from the mobile unit. When provided, the RMS delay spread is preferably included along with the channel quality metrics and other information discussed in the previous step.

Figure 5:
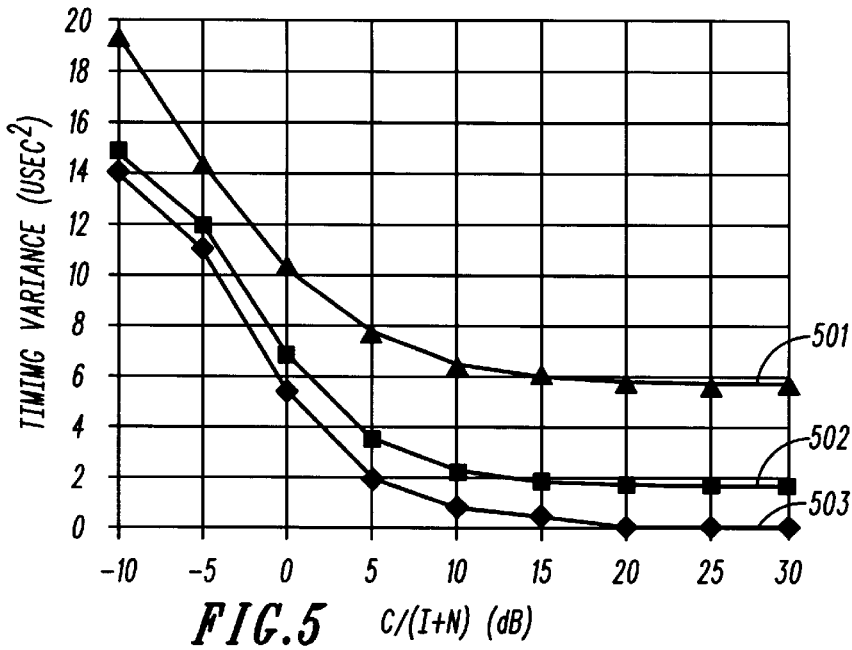
FIG. 5 is a graph illustrating examples of predetermined relationships used to determine time of arrival variances.

At step 406, the location processor determines M time of arrival variances, one for each channel quality metric. To the extent that known data symbols are used to derive the channel quality metrics, the time of arrival variances are indicative of the uncertainty in the measured propagation delay for each signal. In the preferred embodiment, the channel quality metrics are mapped into time of arrival variances according to predetermined relationships. FIG. 5 illustrates examples of such predetermined relationships.

Each predetermined relationship illustrated in FIG. 5 is depicted by a curve 501–503. These predetermined relationships are derived using computer simulation and/or field testing to determine expected time measurement performance under a wide range of conditions. Using such curves 501–503, values of C/I+N (measured in decibels along the horizontal axis) are mapped into corresponding time of arrival variance values (measured in $\mu\text{sec}^2$ along the vertical axis). Value ranges for both the horizontal and vertical axes other than those shown are possible and are a matter of design choice. In practice, each predetermined relationship is implemented using stored tables or empirically-defined mathematical functions. Although a single family of curves 501–503 is shown in FIG. 5, it is possible to derive many families of such curves.

Assuming use of RMS delay spread measurements, each of the curves 501–503 is indexed according to a particular value of a received RMS delay spread. Each curve 501–503 represents a range of RMS delay spreads centered around a single value. Thus, in the examples shown, a first predetermined relationship, represented by a first curve 501, is used when the received RMS delay spread is closest to 5.0 $\mu$sec.; a second predetermined relationship, represented by a second curve 502, is used when the received RMS delay spread is closest to 2.5 $\mu$sec.; and a third predetermined relationship, represented by a third curve 503, is used when the received RMS delay spread is closest 0 $\mu$sec. In the event that RMS delay spreads are not used, the single predetermined relationship used would comprise either an average of the various curves or would be chosen as that curve corresponding to the most frequently measured RMS delay spread.

Returning to FIG. 4, differential time of arrival variances are determined, at step 408, according to the equation:

$$\hat{\sigma}_{0i}^2 = \frac{\hat{\sigma}_0^2}{N_0} + \frac{\hat{\sigma}_i^2}{N_i} = V_0 + V_i$$

Thus, each differential time of arrival variance $\sigma_{0i}^2$ is seen to be the sum of a scaled time of arrival variance $V_0$ for a first site and a scaled time of arrival variance $V_i$ for an i'th neighboring site to the first site ($1 \leq i \leq M-1$). The scaled time of arrival variance $V_0$ for the first site is the time of arrival variance for the first site, $\sigma_0^2$, divided by the number of receptions of known data symbols, No, sampled to determine the channel quality metric (and, subsequently, the time of arrival variance) for the first site. Likewise, the scaled time of arrival variance for the i'th site, $V_i$, is the time of arrival variance for the i'th site, $\sigma_i^2$, divided by the number of receptions of known data symbols used, $N_i$. Although the first site is preferably the serving site for the mobile unit under consideration, it is equally possible for the first site to be one of the neighboring sites.

Assuming that the mean DPR error is zero and that the known data symbol measurements at each site are uncorrelated, the elements of a time of arrival differential weighting matrix (or covariance matrix), $\underline{V}$, can be determined according to the following equations:

$$v_{jk}=V_0+V_j \text{ for } j=k; \text{ and}$$

$$v_{jk}=V_0 \text{ for } j \neq k.$$

For a location determination involving a first site and M−1 neighbor sites, the time of arrival differential weighting matrix becomes:

$$\underline{V} = \begin{bmatrix} \hat{\sigma}_{01}^2 & V_0 & V_0 & \cdots & V_0 \\ V_0 & \cdot & & & V_0 \\ V_0 & & \hat{\sigma}_{0i}^2 & & V_0 \\ \cdot & & & \cdot & \\ \cdot & & & & \cdot \\ V_0 & V_0 & V_0 & \cdots & \hat{\sigma}_{0M-1}^2 \end{bmatrix}$$

recalling that $\sigma_{0i}^2 = V_0 + V_i$. Thus, the present invention provides a convenient method for estimating a covariance matrix for use in a WLS solution.

Having determined a covariance matrix, the location processor, at step 410, solves for the WLS location solution given by the equation:

$$\underline{V}\vec{\Delta}_D = \underline{V}\underline{C}\vec{\Delta}_{xy}$$

The procedures for determining the WLS location solution are further described with reference to FIG. 6 below. The result of determining the WLS location solution is a location estimate for the given mobile unit. Consequently, at step 412, the location estimate is optionally sent to a mobile unit or infrastructure entity that originally requested the location information.

Figure 6:
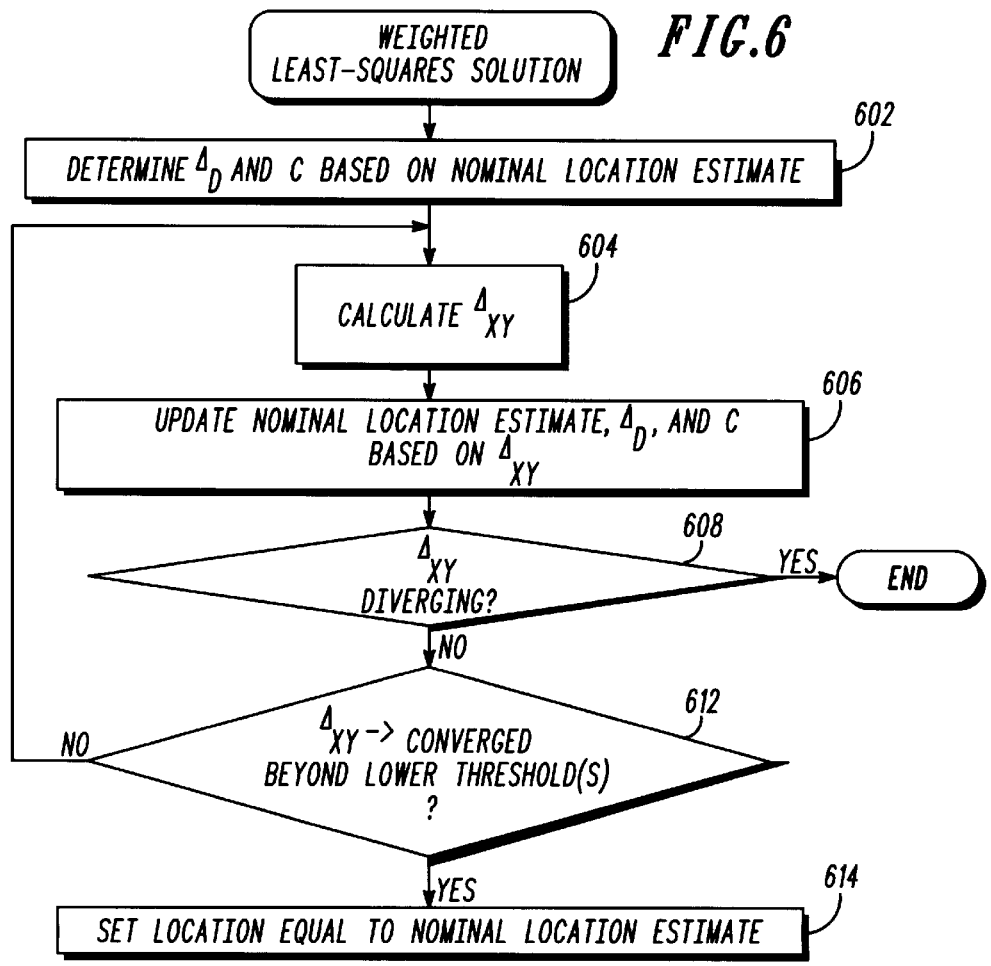
FIG. 6 is a flowchart illustrating the determination of a location estimate using a weighted least squares solution.

FIG. 6 illustrates a method for determining a location estimate using a WLS solution. At step 602, a pseudo-range differential correction vector $\vec{\Delta}_D$ and a differential direction cosine matrix $\underline{C}$ are determined based on a nominal location estimate, denoted by the coordinates $(x_n, y_n)$. The initial nominal location estimate is selected to be within the boundaries of the first cell (preferably the serving cell), and is also selected based upon the type of cells being used. That is, if the first cell is "sectorized", as known in the art, the center of mass of the serving sector is selected as the initial nominal location estimate. However, if the first cell is not sectorized, a good choice for an initial nominal location estimate is a point on a circle centered on, and equal to approximately half the radius of, the first cell. Furthermore, knowledge of which neighboring cells are to be used in the location determination may be used to further refine selection of such a point by possibly selecting a point closest to the neighboring cells.

Given the initial nominal location estimate and knowledge of both the transceiver locations and TOTS errors, $e_0$ and $e_i$, for the first site and i'th neighboring transceiver ($1 \leq i \leq M-1$), respectively, nominal differential pseudo-ranges can be calculated according to the equation:

$$D_{n,0i} = (D_{n,0} + e_0) - (D_{n,i} + e_i)$$

wherein $D_{n,0}$ is the known distance between the nominal location estimate and the serving site, and $D_{n,i}$ is the known distance between the nominal location estimate and the transceiver for the i'th neighboring site. With the nominal DPRs, the correction values included in $\vec{\Delta}_D$ are calculated as the difference between the DPRs measured by the mobile (and conveyed to the location processor) and the nominal DPRs. Thus, for a location determination involving a first site and M−1 neighbor sites, $\vec{\Delta}_D$ is defined as:

$$\vec{\Delta}_D = \begin{bmatrix} \hat{D}_{01} - D_{n,01} \\ \cdot \\ \cdot \\ \hat{D}_{0i} - D_{n,0i} \\ \cdot \\ \cdot \\ \hat{D}_{0M-1} - D_{n,0M-1} \end{bmatrix}$$

The differential direction cosine matrix $\underline{C}$ includes differential direction cosines for each of the M−1 neighboring sites, and is defined as:

$$\underline{C} = \begin{bmatrix} c_{x,n,01} & c_{y,n,01} \\ \cdot & \cdot \\ \cdot & \cdot \\ c_{x,n,0i} & c_{y,n,0i} \\ \cdot & \cdot \\ \cdot & \cdot \\ c_{x,n,0M-1} & c_{y,n,0M-1} \end{bmatrix}$$

Denoting the known location of the i'th neighboring site as $(x_i, y_i)$, the elements of $\underline{C}$ are defined as follows:

$$c_{x,n,0i} = \frac{x_n - x_0}{D_{n,0}} - \frac{x_n - x_i}{D_{n,i}}$$

$$c_{y,n,0i} = \frac{y_n - y_0}{D_{n,0}} - \frac{y_n - y_i}{D_{n,i}}$$

Having determined $\vec{\Delta}_D$ and $\underline{C}$, a nominal location correction vector $\vec{\Delta}_{xy}$ can be determined at step 604. The nominal location correction vector contains corrections for the nominal location estimate and is defined as:

$$\vec{\Delta}_{xy} = \begin{bmatrix} \delta_x \\ \delta_y \end{bmatrix}$$

Using linear algebra to solve WLS location solution, the nominal location correction vector is given by the equation:

$$\vec{\Delta}_{xy} = (\underline{C}^T \underline{V}^{-1} \underline{C})^{-1} \underline{C}^T \underline{V}^{-1} \vec{\Delta}_D$$

At step 606, having solved for the nominal location correction vector, the nominal location estimate is updated by adding $\vec{\Delta}_{xy}$, i.e., $(x_n + \delta_x, y_n + \delta_y)$. With this new nominal location estimate, both the pseudo-range differential correction vector $\vec{\Delta}_D$ and the differential direction cosine matrix $\underline{C}$ are also recalculated to reflect the correction to the nominal location estimate. This process of calculating $\vec{\Delta}_D$, $\underline{C}$ and $\vec{\Delta}_{xy}$; updating the nominal location estimate; and recalculating $\vec{\Delta}_D$, $\underline{C}$ and $\vec{\Delta}_{xy}$ can be iterated until a final solution is reached, as described below.

At step 608, it is determined whether the nominal location correction vector is diverging. This is done by comparing the components of the current nominal location correction vector ($\delta_{x,current}$, $\delta_{y,current}$) with the components of the previously calculated nominal location correction vector ($\delta_{x,previous}$, $\delta_{y,previous}$) In particular, divergence is deemed to have occurred when the following conditions are met:

$$\delta_{x,current} > U \cdot \delta_{x,previous}$$

$$\delta_{y,current} > U \cdot \delta_{y,previous}$$

U is an upper threshold having a value greater than unity and, in the preferred embodiment, has a value of 10. It is understood that, rather than a single upper threshold, separate thresholds, $U_x$ and $U_y$, having different values may be used for the separate divergence conditions. If it is determined that divergence has occurred, further iterations of the WLS solution are discontinued, and no location estimate is determined.

If the divergence conditions are not met, it is determined at step 612 whether a magnitude of the nominal location correction vector has converged below a lower threshold, L, as described by the equation:

$$|\overline{\Delta}_{xy}| = \sqrt{\delta_x^2 + \delta_y^2} < L$$

The value of L is a matter of design choice, and in simulations has been set to a value of 8.05 meters (0.005 miles). If the nominal location correction vector has not converged below the lower threshold, processing returns to step 604 where the WLS solution is allowed to iterate another time. However, if the nominal location correction vector has converged, the location estimate is set equivalent to the current nominal location estimate at step 614.

In light of the above, the present invention is seen to provide an improved method for estimating a covariance matrix, which in turn enables the computationally-efficient WLS solution to be used in a location determination context. In addition to the embodiment in which the location processor cooperates with a mobile unit, the present invention may also be beneficially employed in those cases where a location determination is desired using only the fixed infrastructure (transceivers and location processor) or only a mobile unit. These other embodiments are described with reference to FIGS. 7–9.

Figure 7:
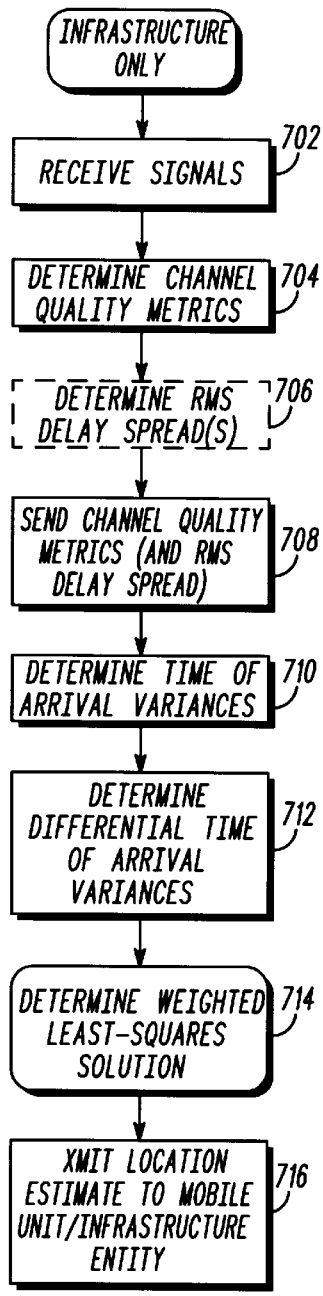
FIG. 7 is a flowchart illustrating operation of a fixed infrastructure when the fixed infrastructure determines a location of a mobile unit based on signals transmitted by the mobile unit.

FIG. 7 illustrates an infrastructure-only approach to location determination in accordance with the present invention. In particular, the method illustrated in FIG. 7 would be suitably performed by the infrastructure illustrated in FIGS. 1 and 2. At step 702, M different transceivers (M≧3) each receive a representation of a signal transmitted by a mobile unit, resulting in M different representations of the signal. That is, each transceiver receives the same signal, but subject to different error conditions (i.e., fading, interference, etc.) than the other transceivers. For example, referring to FIG. 1, transceivers $X_0$, $X_1$ and $X_2$ receive a signal transmitted by the mobile unit 160. In the preferred embodiment, the signal transmitted by the mobile unit is a sequence of known data symbols essentially equivalent to those transmitted by the transceivers, as described above.

At step 704, each transceiver determines a channel quality metric for its corresponding representation in essentially the same manner as described above (FIG. 3, step 304). Likewise, at step 706, an RMS delay spread may optionally be determined by each transceiver as described above (FIG. 3, step 306). Also, PRs are determined by each transceiver.

At step 708, the channel quality metrics and, if available, the RMS delay spreads, are sent by the transceivers to the location processor. Additionally, each transceiver conveys its PR, and the number of receptions of known data symbols used to determine the channel quality metrics to the location processor.

Having received the information sent at step 708, the location processor executes steps 710–716 to determine a covariance matrix and WLS location solution. Because steps 710–716 are essentially equivalent to steps 406–412 of FIG. 4, further description is not necessary.

Figure 8:
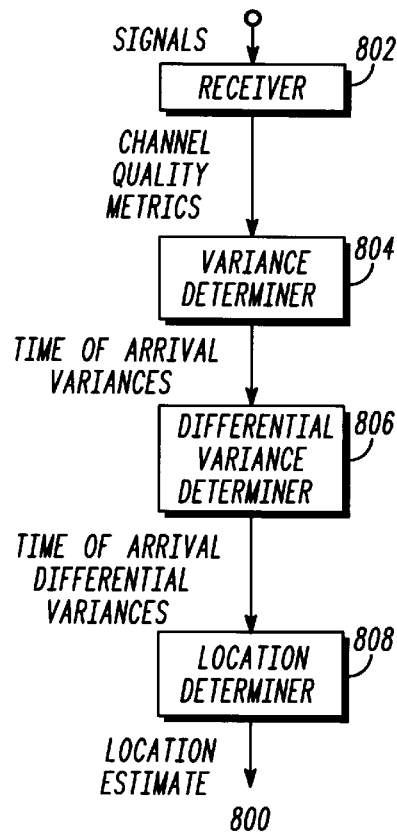
FIG. 8 is a block diagram of mobile unit.
Figure 9:
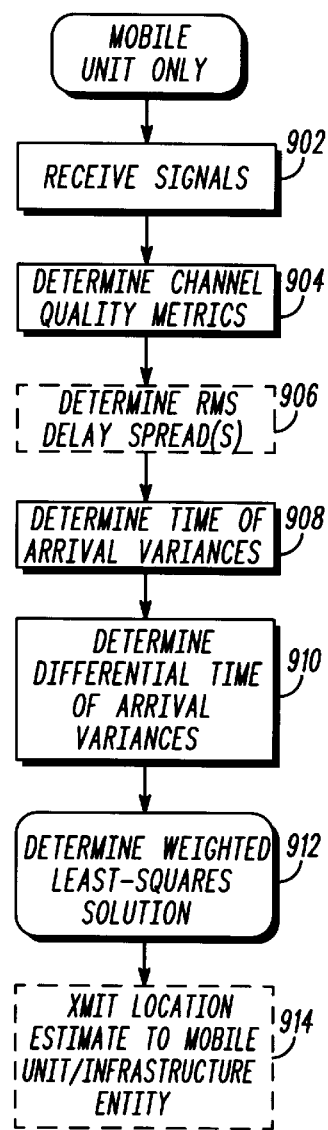
FIG. 9 is a flowchart illustrating operation of the mobile unit of FIG. 8 when the mobile unit independently determines its own location.

Another embodiment of the present invention, a mobile-only approach, is illustrated in FIGS. 8–9. FIG. 8 is a block diagram of a mobile unit suitable for a mobile-only approach to location determination. In particular, the mobile 800 comprises a receiver 802, a variance determiner 804 coupled to the output of the receiver 802, a differential variance determiner 806 coupled to the output of the variance determiner 804, and a location determiner 808 coupled to the output of the differential variance determiner 806. The variance determiner 804, differential variance determiner 806, and the location determiner 808 are structurally and functionally equivalent to the variance determiner 204, differential variance determiner 206, and the location determiner 208, respectively, described above with reference to FIG. 2. Also, the variance determiner 804, differential variance determiner 806, and the location determiner 808 are preferably implemented as one or more software-based algorithms stored in memory and executed by a digital computing device resident in the mobile unit. For the purposes of the present invention, the sole difference between the location processor 200, and the mobile 800 is the inclusion of the receiver 802 in the mobile 800. At a minimum, the receiver 802 must be capable of receiving signals from the infrastructure transceivers and, in the preferred embodiment, must be capable of receiving known data symbols from different transceivers. Additionally, the receiver 802 includes the functionality, described above, required to extract channel quality metrics from the received signals.

Operation of the mobile unit 800 is further illustrated in FIG. 9. In particular, steps 902–906 are equivalent to steps 302–306, respectively, of FIG. 3. That is, the mobile unit receives signals from the transceivers and derives the information required for determination of a WLS location solution. Then, rather than transmitting such information to an infrastructure-based location processor, the mobile unit executes steps 908–914 which are equivalent to steps 406–412, respectively, of FIG. 4.

As demonstrated above, the present invention beneficially provides a method and apparatus for estimating a covariance matrix for use in WLS location determinations. Using channel quality metrics as a basis, the present invention allows a covariance matrix to be efficiently estimated and employed in a WLS location solution. Because the WLS location solution is computationally efficient in comparison with techniques utilizing Kalman filters, and does not require the use of costly GPS receivers, the present invention may be implemented in either an infrastructure-based location processor or a mobile unit, or both in conjunction. Using computer simulations, it has been demonstrated that the present invention can determine the location for a mobile unit to within 125 meters (0.08 miles or 410.1 feet) of its actual location at least 67% of the time.

Although the present invention has been described in terms of the presently preferred embodiments, it will be readily apparent to those skilled in the art that various modifications can be made therein without departing from the spirit of the present invention or from the scope of the appended claims.

We claim:

1. In a wireless communication system comprising a fixed infrastructure in wireless communication with a plurality of mobile units, the fixed infrastructure comprising a location processor, a method for the location processor to estimate a location of a mobile unit of the plurality of mobile units, the method comprising steps of:

determining M channel quality metrics corresponding to the mobile unit, wherein $M \geq 3$;

determining M time of arrival variances based on the channel quality metrics;

determining M−1 time of arrival differential variances based on the time of arrival variances; and determining a weighted least squares solution using the time of arrival differential variances to estimate the location of the mobile unit.

2. The method of claim 1, further comprising a step of: transmitting the location of the mobile unit to the mobile unit.

3. The method of claim 1, further comprising a step of: transmitting the location of the mobile unit to an infrastructure entity of the fixed infrastructure.

4. The method of claim 1, the step of determining the channel quality metrics further comprising a step of receiving the channel quality metrics from the mobile unit.

5. The method of claim 1, further comprising the step of determining the channel quality metrics, wherein the channel quality metrics are carrier-to-interference-plus-noise ratios.

6. The method of claim 5, further comprising a step of receiving, from the mobile unit, at least one RMS delay spread.

7. The method of claim 6, further comprising the step of determining the time of arrival variances based on the carrier-to-interference-plus-noise ratios and the at least one RMS delay spread.

8. The method of claim 6, the step of determining the time of arrival variances further comprising a sub-step of:

mapping the carrier-to-interference-plus-noise ratios into unscaled time of arrival variances according to one of at least one predetermined relationship, wherein the one of the at least one predetermined relationship is indexed according to the at least one RMS delay spread.

9. The method of claim 8, further comprising the step of determining the time of arrival differential variances according to the equation:

$$\hat{\sigma}_{0i}^2 = \frac{\hat{\sigma}_0^2}{N_0} + \frac{\hat{\sigma}_i^2}{N_i} = V_0 + V_i$$

wherein: $\sigma_{0i}^2$ is an i'th time of arrival differential variance;

$V_0$ is a first scaled time of arrival variance corresponding to a first site;

$V_i$ is an i'th scaled time of arrival variance corresponding to an i'th of M−1 neighboring sites;

$\sigma_0^2$ is a first time of arrival variance corresponding to the first site;

$\sigma_i^2$ is an i'th time of arrival variance corresponding to the i'th neighboring site;

$N_0$ is a number of receptions of known data symbols used in determining a first time of arrival measurement corresponding to the first site;

$N_i$ is a number of receptions of known data symbols used in determining an i'th time of arrival measurement corresponding to the i'th neighboring site; and the index i is in the range from 1 to M−1, inclusive.

10. The method of claim 9, further comprising the step of determining the time of arrival differential variances, wherein the first site is a serving site for the mobile unit.

11. The method of claim 9, the step of determining the weighted least squares solution further comprising sub-steps of:

determining a pseudo-range differential correction vector $\vec{\Delta}_D$ and a differential direction cosine matrix $\underline{C}$ based on a nominal location estimate;

calculating a nominal location correction vector $\vec{\Delta}_{xy}$ according to the equation:

$$\vec{\Delta}_{xy} = (\underline{C}^T \underline{V}^{-1} \underline{C})^{-1} \underline{C}^T \underline{V}^{-1} \vec{\Delta}_D$$

wherein a time of arrival differential weighting matrix $\underline{V}$ is defined as:

$$\underline{V} = \begin{bmatrix} \hat{\sigma}_{01}^2 & V_0 & V_0 & \ldots & V_0 \\ & \cdot & & & \\ V_0 & & \cdot & & V_0 \\ & & \cdot & & \\ V_0 & & \hat{\sigma}_{0i}^2 & & V_0 \\ \cdot & & & \cdot & \\ \cdot & & & & \cdot \\ \cdot & & & & \cdot \\ V_0 & V_0 & V_0 & \ldots & \hat{\sigma}_{0M-1}^2 \end{bmatrix}$$

updating the nominal location estimate, the pseudo-range differential correction vector, and the differential direction cosine matrix based on the nominal location correction vector; and iterating the previous steps of calculating and updating so long as the nominal location correction vector is not diverging and so long as the nominal location correction vector has not converged beyond at least one lower threshold.

12. The method of claim 11, the step of determining the weighted least squares solution further comprising a sub-step of:

setting the location of the mobile unit equivalent to the nominal location estimate when the nominal location correction vector has converged beyond the at least one lower threshold.

13. The method of claim 11, the step of determining the weighted least squares solution further comprising a sub-step of:

discontinuing the iteration of the steps of calculating and updating when the nominal location correction vector has diverged beyond at least one upper threshold.

14. In a wireless communication system comprising a fixed infrastructure in wireless communication with a plurality of mobile units, the fixed infrastructure further comprising a plurality of geographically-diverse fixed transceivers and a location processor, a method for a mobile unit of the plurality of mobile units to estimate a location of the mobile unit, the method comprising steps of:

receiving M signals from M transceivers of the plurality of geographically-diverse fixed transceivers, wherein each of the signals uniquely corresponds to one of the transceivers, and wherein M≧3;

determining M channel quality metrics, wherein each of the channel quality metrics uniquely corresponds to one of the signals;

sending, to the location processor, the channel quality metrics; and receiving, from the location processor, the location of the mobile unit, wherein the location of the mobile unit is based on the channel quality metrics.

15. The method of claim 14, further comprising the step of receiving the signals, wherein each of the signals comprises known data symbols.

16. The method of claim 15, further comprising the step of determining the time of arrival measurements, wherein each time of arrival measurement is based on an average over the at least one reception of known data symbols.

17. The method of claim 14, further comprising the step of determining the channel quality metrics, wherein the channel quality metrics are carrier-to-interference-plus-noise ratios.

18. The method of claim 14, further comprising steps of:

determining at least one RMS delay spread for the signals; and sending the at least one RMS delay spread to the location processor.

19. The method of claim 18, further comprising the step of receiving the location of the mobile unit, wherein the location of the mobile unit is based on the channel quality metrics and the at least one RMS delay spread.

20. In a wireless communication system comprising a fixed infrastructure in wireless communication with a plurality of mobile units, the fixed infrastructure further comprising a plurality of geographically-diverse fixed transceivers and a location processor in communication with the plurality of geographically-diverse fixed transceivers, a method for estimating a location of a mobile unit of the plurality of mobile units, the method comprising steps of:

receiving, by M transceivers of the plurality of geographically diverse transceivers, M representations of a signal sent by the mobile unit, wherein each of the representations uniquely corresponds to one of the transceivers, and wherein M≧3;

determining, by the transceivers, M channel quality metrics, wherein each of the channel quality metrics uniquely corresponds to one of the representations;

sending, from the transceivers to the location processor, the channel quality metrics;

determining, by the location processor, M time of arrival variances based on the channel quality metrics, wherein each of the time of arrival variances uniquely corresponds to one of the channel quality metrics;

determining, by the location processor, M−1 time of arrival differential variances based on the time of arrival variances; and determining, by the location processor, a weighted least squares solution using the time of arrival differential variances to estimate the location of the mobile unit.

21. The method of claim 20, further comprising the step of receiving the representations, wherein each of the representations comprises known data symbols.

22. The method of claim 21, further comprising the step of determining the time of arrival measurements, wherein each time of arrival measurement is based on an average over the at least one reception of known data symbols.

23. The method of claim 20, further comprising the step of determining the channel quality metrics, wherein the channel quality metrics are carrier-to-interference-plus-noise ratios.

24. The method of claim 23, further comprising a step of:

determining, by the transceivers, RMS delay spreads that uniquely correspond to each of the representations.

25. The method of claim 24, further comprising the step of determining the time of arrival variances based on the carrier-to-interference-plus-noise ratios and the RMS delay spreads.

26. The method of claim 25, the step of determining the time of arrival variances further comprising a sub-step of:

mapping the carrier-to-interference-plus-noise ratios into unscaled time of arrival variances according to one of at least one predetermined relationship, wherein the one of the at least one predetermined relationship is indexed according to the RMS delay spread.

27. The method of claim 26, further comprising the step of determining the time of arrival differential variances according to the equation:

$$\hat{\sigma}_{0i}^2 = \frac{\hat{\sigma}_0^2}{N_0} + \frac{\hat{\sigma}_i^2}{N_i} = V_0 + V_i$$

wherein: $\sigma_{0i}^2$ is an i'th time of arrival differential variance;

$V_0$ is a first scaled time of arrival variance corresponding to a first site;

$V_i$ is an i'th scaled time of arrival variance corresponding to an i'th of the M−1 neighboring sites;

$\sigma_0^2$ is a first time of arrival variance corresponding to the first site;

$\sigma_i^2$ is an i'th time of arrival variance corresponding to the i'th neighboring site;

$N_0$ is a number of receptions of known data symbols used in determining a first time of arrival measurement corresponding to the first site;

$N_i$ is a number of receptions of known data symbols used in determining an i'th time of arrival measurement corresponding to the i'th neighboring site; and the index i is in the range from 1 to M−1, inclusive.

28. The method of claim 27, further comprising the step of determining the time of arrival differential variances, wherein the first site is a serving site for the mobile unit.

29. The method of claim 27, the step of determining the weighted least squares solution further comprising sub-steps of:

determining a pseudo-range differential correction vector $\vec{\Delta}_D$ and a differential direction cosine matrix $\underline{C}$ based on a nominal location estimate;

calculating a nominal location correction vector $\vec{\Delta}_{xy}$ according to the equation:

$$\vec{\Delta}_{xy} = (\underline{C}^T \underline{V}^{-1} \underline{C})^{-1} \underline{C}^T \underline{V}^{-1} \vec{\Delta}_D$$

wherein a time of arrival differential weighting matrix $\underline{V}$ is defined as:

$$\underline{V} = \begin{bmatrix} \hat{\sigma}_{01}^2 & V_0 & V_0 & \ldots & V_0 \\ V_0 & \cdot & & & V_0 \\ V_0 & & \hat{\sigma}_{0i}^2 & & V_0 \\ \cdot & & & \cdot & \\ \cdot & & & & \cdot \\ V_0 & V_0 & V_0 & \ldots & \hat{\sigma}_{0M-1}^2 \end{bmatrix}$$

updating the nominal location estimate, the pseudo-range differential correction vector, and the differential direction cosine matrix based on the nominal location correction vector; and iterating the previous steps of calculating and updating so long as the nominal location correction vector is not diverging and so long as the nominal location correction vector has not converged beyond at least one lower threshold.

30. The method of claim 29, the step of determining the weighted least squares solution further comprising a sub-step of:

setting the location of the mobile unit equivalent to the nominal location estimate when the nominal location correction vector has converged beyond the at least one lower threshold.

31. The method of claim 29, the step of determining the weighted least squares solution further comprising a sub-step of:

discontinuing the iteration of the steps of calculating and updating when the nominal location correction vector has diverged beyond at least one upper threshold.

32. The method of claim 20, further comprising a step of: transmitting, by the location processor, the location of the mobile unit to the mobile unit.

33. The method of claim 20, further comprising a step of: transmitting, by the location processor, the location of the mobile unit to an infrastructure entity of the fixed infrastructure.

34. In a wireless communication system comprising a fixed infrastructure in wireless communication with a plurality of mobile units, the fixed infrastructure further comprising a plurality of geographically-diverse fixed transceivers, a method for a mobile unit of the plurality of mobile units to estimate a location of the mobile unit, the method comprising steps of:

receiving M signals from M transceivers of the plurality of geographically-diverse fixed transceivers, wherein each of the signals uniquely corresponds to one of the transceivers, and wherein $M \geq 3$;

determining M channel quality metrics, wherein each of the channel quality metrics uniquely corresponds to one of the signals;

determining M time of arrival variances based on the channel quality metrics, wherein each of the time of arrival variances uniquely corresponds to one of the channel quality metrics;

determining M−1 time of arrival differential variances based on the time of arrival variances; and determining a weighted least squares solution using the time of arrival differential variances to estimate the location of the mobile unit.

35. The method of claim 34, further comprising the step of receiving the signals, wherein each of the signals comprises known data symbols.

36. The method of claim 35, further comprising the step of determining the time of arrival measurements, wherein each time of arrival measurement is based on an average over the at least one reception of known data symbols.

37. The method of claim 34, further comprising the step of estimating the channel quality metrics, wherein the channel quality metrics are carrier-to-interference-plus-noise ratios.

38. The method of claim 37, further comprising a step of:

determining at least one RMS delay spread for the signals.

39. The method of claim 38, further comprising the step of determining the time of arrival variances based on the carrier-to-interference-plus-noise ratios and the at least one RMS delay spread.

40. The method of claim 39, the step of determining the time of arrival variances further comprising a sub-step of:

mapping the carrier-to-interference-plus-noise ratios into unscaled time of arrival variances according to one of at least one predetermined relationship, wherein the one of the at least one predetermined relationship is indexed according to the at least one RMS delay spread.

41. The method of claim 40, further comprising the step of determining the time of arrival differential variances according to the equation:

$$\hat{\sigma}_{0i}^2 = \frac{\hat{\sigma}_0^2}{N_0} + \frac{\hat{\sigma}_i^2}{N_i} = V_0 + V_i$$

wherein: $\sigma_{0i}^2$ is an i'th time of arrival differential variance;

$V_0$ is a first scaled time of arrival variance corresponding to a first site;

$V_i$ is an i'th scaled time of arrival variance corresponding to an i'th of M−1 neighboring sites $\sigma_0^2$ is a first time of arrival variance corresponding to the first site;

$\sigma_i^2$ is an i'th time of arrival variance corresponding to the i'th neighboring site;

$N_0$ is a number of receptions of known data symbols used in determining a first time of arrival measurement corresponding to the first site;

$N_i$ is a number of receptions of known data symbols used in determining an i'th time of arrival measurement corresponding to the i'th neighboring site; and the index i is in the range from 1 to M−1, inclusive.

42. The method of claim 41, further comprising the step of determining the time of arrival differential variances, wherein the first site is a serving site for the mobile unit.

43. The method of claim 41, the step of determining the weighted least squares solution further comprising sub-steps of:

determining a pseudo-range differential correction vector $\vec{\Delta}_D$ and a differential direction cosine matrix $\underline{C}$ based on a nominal location estimate;

calculating a nominal location correction vector $\vec{\Delta}_{xy}$ according to the equation:

$$\vec{\Delta}_{xy} = (\underline{C}^T \underline{V}^{-1} \underline{C})^{-1} \underline{C}^T \underline{V}^{-1} \vec{\Delta}_D$$

wherein a time of arrival differential weighting matrix $\underline{V}$ is defined as:

$$\underline{V} = \begin{bmatrix} \hat{\sigma}^2_{01} & V_0 & V_0 & \ldots & V_0 \\ V_0 & \ddots & & & V_0 \\ V_0 & & \hat{\sigma}^2_{0i} & & V_0 \\ \vdots & & & \ddots & \vdots \\ V_0 & V_0 & V_0 & \ldots & \hat{\sigma}^2_{0M-1} \end{bmatrix}$$

updating the nominal location estimate, the pseudo-range differential correction vector, and the differential direction cosine matrix based on the nominal location correction vector when the nominal location correction vector is greater than a predetermined threshold; and iterating the previous steps of calculating and updating so long as the nominal location correction vector is not diverging and so long as the nominal location correction vector has not converged beyond at least one lower threshold.

44. The method of claim 43, the step of determining the weighted least squares solution further comprising a sub-step of:

setting the location of the mobile unit equivalent to the nominal location estimate when the nominal location correction vector has converged beyond the at least one lower threshold.

45. The method of claim 43, the step of determining the weighted least squares solution further comprising a sub-step of:

discontinuing the iteration of the steps of calculating and updating when the nominal location correction vector has diverged beyond at least one upper threshold.

46. A location processor comprising:

a digital computing device;

a memory coupled to the digital computing device, the memory having stored thereon executable instructions that, when executed by the digital computing device, cause the digital computing device to comprise:

a variance determiner, responsive to M channel quality metrics corresponding to a mobile unit, that produces M time of arrival variances, wherein $M \geq 3$;

a differential variance determiner, responsive to the time of arrival variances, that produces M−1 time of arrival differential variances; and a location determiner, responsive to the time of arrival differential variances, that calculates a weighted least squares solution to estimate a location of the mobile unit.

47. A mobile unit comprising:

a receiver, responsive to M signals from M transceivers of a plurality of geographically-diverse fixed transceivers, that produces M channel quality metrics, wherein each of the signals and each of the channel quality metrics uniquely corresponds to one of the transceivers, and wherein $M \geq 3$;

a location processor, coupled to the receiver, comprising:

a digital computing device;

a memory coupled to the digital computing device, the memory having stored thereon executable instructions that, when executed by the digital computing device, cause the digital computing device to comprise:

a variance determiner, responsive to the channel quality metrics, that produces M time of arrival variances;

a differential variance determiner, responsive to the time of arrival variances, that produces M−1 time of arrival differential variances; and a location determiner, responsive to the time of arrival differential variances, that calculates a weighted least squares solution to estimate a location of the mobile unit.

48. A communication system comprising:

at least M geographically diverse transceivers that each receive a corresponding one of M representations of a signal sent by a mobile unit, and that each determine a channel quality metric for the corresponding one of the representations, wherein $M \geq 3$;

a location processor, coupled to the transceivers, comprising:

a digital computing device;

a memory coupled to the digital computing device, the memory having stored thereon executable instructions that, when executed by the digital computing device, cause the digital computing device to comprise:

a variance determiner, responsive to the channel quality metrics, that produces M time of arrival variances;

a differential variance determiner, responsive to the time of arrival variances, that produces M−1 time of arrival differential variances; and a location determiner, responsive to the time of arrival differential variances, that calculates a weighted least squares solution to estimate a location of the mobile unit.

* * * * *

UNITED STATES PATENT AND TRADEMARK OFFICE
CERTIFICATE OF CORRECTION

PATENT NO. : 5,884,215
DATED : March 16, 1999
INVENTOR(S) : Birchler et al.

It is certified that error appears in the above-indentified patent and that said Letters Patent is hereby corrected as shown below:

Column 13, line 44 reads "$M \geqq 3$", should be --$M > 3$--

Signed and Sealed this

Twenty-seventh Day of July, 1999

Attest:

Q. TODD DICKINSON

*Attesting Officer*     *Acting Commissioner of Patents and Trademarks*